Aug. 16, 1932.   W. H. BROWN   1,872,068
LOW PRESSURE SIGNAL
Filed March 30, 1931
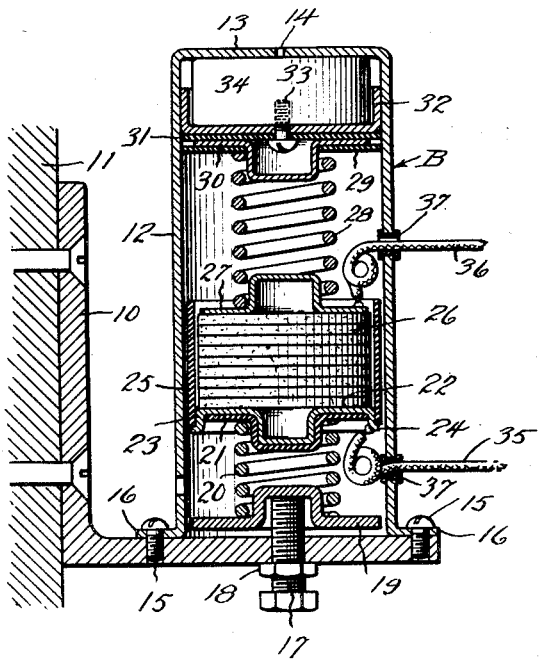
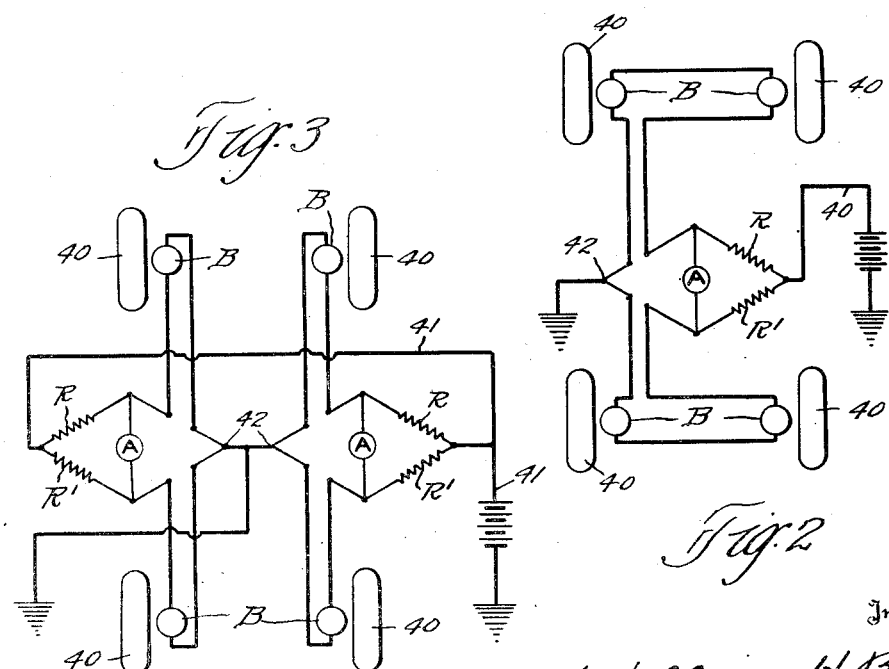
Inventor
William H Brown
By Hull Brock + West
Attorney Patented Aug. 16, 1932

1,872,068

UNITED STATES PATENT OFFICE

WILLIAM H. BROWN, OF SHAKER HEIGHTS, OHIO, ASSIGNOR TO SPICER AIRFLATER, INC., OF CLEVELAND, OHIO, A CORPORATION OF OHIO

LOW PRESSURE SIGNAL

Application filed March 30, 1931. Serial No. 526,254.

This invention relates to a low pressure signal system adapted for use on vehicles which are equipped with pneumatic tires such as automobiles, trucks, trailers and the like.

I am aware that prior to my invention, numerous devices have been proposed for indicating deflation of a pneumatic tire but so far as I am aware, such of them as are operative under the conditions under which my invention is operative have had some portion of the mechanism mounted upon and carried by the vehicle wheel itself.

The principal object of my invention is to provide a signal system adapted to have parts mounted on the axles of a vehicle adjacent the wheels, on the brake drum shield or some other part of the vehicle adjacent to but not on the wheel which will serve to indicate on a meter positioned at some convenient location a state of deflation in one tire below that of another tire. With this and other objects in view, the invention consists of the novel features of construction and arrangement of parts as hereinafter described and claimed.

My invention is based upon the principle that a motor vehicle equipped with pneumatic tires passing over a road having irregularities therein, will transmit to the axle through the pneumatic tire and wheel, a force and a motion which will vary according to the degree of inflation of the tire. My invention aims to take advantage of the differences in forces transmitted to the axle by an inflated tire and one which is partially deflated or at a lower pressure.

I have disclosed an illustrative embodiment of my invention in the accompanying drawing in which Fig. 1 is a central sectional view through an "inertia-rheostat" unit; Fig. 2 is a schematic illustration of the wiring and accessory electrical instruments required and Fig. 3 is a similar schematic wiring diagram of a modified form.

Inertia-rheostat unit

The inertia-rheostat unit indicated generally by the numeral B may be mounted on an angle bracket 10 secured to the axle of the vehicle, the brake drum shield 11 or other part of the vehicle in fixed relation to the axle thereof. The unit B is contained in the cylinder 12 which is provided with a substantially closed end 13 provided with a small opening 14. This cylinder is adapted to be attached to the bracket 10 by means of screws 15 passing through outturned lugs 16 at the lower end of such cylinder. Threaded through the bracket 10 is an adjusting screw 17 provided with a lock washer 18. A cup washer 19 cooperates with the set screw 17. Surrounding the central boss of the cup washer 19 is the coil spring 20.

Contacting the upper end of the spring 20 is a cup washer 21 made of insulating material and having its boss extending into the upper end of said spring. Above the washer 21 is another cup washer 22 having its boss extending into the boss of the washer 21 and having a downturned flange 23 provided with a short outturned lip 24. Frictionally received over the flange 23 is a cylindrical member 25 composed of insulating material. The washer 22 and cylinder 25 are so related in size as to be frictionally held against separation. The small outturned lip 24 may be employed for convenience in assembling but it is to be understood that the same is of less extent than the thickness of the insulated cylinder 25 whereby it is prevented from coming into contact with the wall of the cylinder 12.

Received in the cylinder 25 is a stack of carbon disks 26. Above and contacting the carbon disks is a cup washer 27 having its boss portion extending into a coil spring 28. The spring 28 bears at its upper end against an insulating washer 29 which is provided with a central opening through which extends the boss of the cup washer 30. The cup washer 30 bears against an insulating disk 31 which in turn bears against a pump washer 32. A screw 33 passes through the insulating washer 31 and pump washer 32 into a weight 34 whereby to constitute a piston with the weight attached or fixedly connected thereto. Attached to the washers 22 and 27 are conductors 35 and 36 having flexible connections and passing through the convex wall of the cylinder 12 Protectors 37 of insulating material may be employed to prevent chafing of the insulation of the conductors 35 and 36.

Electrical connections

In Fig. 2 I have illustrated the preferred electrical connections. The unit illustrated in Fig. 1 is indicated by a circle labeled B. As hereinbefore indicated, the units B are mounted adjacent the wheels 40 of the pneumatic tire equipped vehicle. The resistances R and R' together with the units B are connected as shown to form a conventional Wheatstone bridge. The battery of the motor vehicle is connected by means of a conductor 41 to a point between the resistances R and R'. An ammeter A or galvanometer is connected across the opposite ends of the resistances R and R'. The front wheel resistances B, connected in series, make up one of the remaining arms of the bridge while the rear wheel units B make up the fourth arm thereof. The point of contact 42 between the third and fourth arms of the bridge is grounded as indicated.

In the alternative modification of Fig. 3, similar connections are employed except that the left wheels are connected in one system and the right wheels in the other, a separate comparison between the left wheels and the right wheels being indicated by the two ammeters or galvanometers A. Similar reference numerals are employed in Figs. 2 and 3.

Operation

From the foregoing, it will be seen that the unit B consists essentially of a carbon pile rheostat controlled by an inertia operated weight 34 which cooperates with the pump washer 32 and the opening 14 to create a dashpot effect to retard the return of the weight 34 to the normal position shown when it is moved away from such position by irregularities in the road. If the aperture 14 is made sufficiently small, any given irregularity in the road causing a considerable depression of the weight will operate on the rear wheel before the weight 34 of the front wheel unit shall have traversed any considerable part of its return to normal position. In this way, it will be seen that the largest shocks over a small stretch of road will determine the position of both front and rear weights 34 and cause them to ride at substantially the same degree of depression. This substantially identical depression will result in substantially identical resistance in the rheostats 26, with the result that R and R' being of equal value, there will be no deflection of the galvanometer A. If, however, one of the tires is partially deflated, the force transmitted by a given irregularity in the road to the weights 34 will be different for the wheels compared and as a result the parallel paths of the Wheatstone bridge will be of different resistance value and a current will flow through the galvanometer.

It thus appears that a galvanometer having its pointer at a middle position will be deflected in one direction by a partially deflated front tire and in the opposite direction by a partially deflated rear tire. The difference of operation between the circuits in Figs. 2 and 3 will be obvious and require no comment. The initial spring tension on the weights 34 may be conveniently adjusted by means of the screw 17. It is to be understood that the dimensions of the various parts will be such that with tires to be compared inflated to the same pressure, the resistances of the two variable arms of the Wheatstone bridge will remain the same irrespective of the size of the road irregularity and angle of the slope of the road forwardly or laterally.

While I have illustrated and described the weight 34 as having a vertical movement, it is obviously not necessary that it should be exactly vertical but only that its movement should have a vertical component, and the words "vertical", "vertically movably" and words of similar import as used herein are to be understood in this light and not in a limiting sense as indicating a strictly vertical motion.

While I have shown and described certain illustrative embodiments of my invention, I wish it understood that I am not limited to the details thereof but may carry out my invention in numerous forms within the scope of the appended claims.

Having thus described my invention, what I claim is:

1. A low pressure signal for a pneumatic tire equipped vehicle including, a pair of weights vertically movably mounted one adjacent each of a pair of wheels of a vehicle and carried by a part of the vehicle other than the wheel, mechanism operated by each of said weights for transmitting a force proportional to a force caused to be exerted upon that weight by irregularities in a road over which the vehicle is passing, and means for indicating a difference in forces so transmitted from said weights.

2. A low pressure signal for a pneumatic tire equipped vehicle including, a pair of weights vertically movably mounted one adjacent each of a pair of wheels of a vehicle and carried by a part of the vehicle other than the wheel, each said weight being vertically movable by forces exerted as a result of road irregularities, mechanism controlled by each weight for transmitting forces proportional to forces caused to be exerted upon said weight by irregularities in a road over which the vehicle is passing, and means for indicating a difference in forces so transmitted from said weights.

3. A low pressure signal for a pneumatic tire equipped vehicle comprising, a unit including a rheostat mounted adjacent each of a pair of wheels of said vehicle on a part thereof other than a wheel, additional mechanism constituting with said rheostat a Wheatstone bridge, each said rheostat forming one arm resistance of said bridge, said unit further including a vertically movably mounted weight adapted to be actuated by forces transmitted thereto through the wheel due to road irregularities and controlling said rheostat, and means for retarding motion of said weight in one direction.

4. A low pressure indicator for a pneumatic-tire-equipped vehicle including: a pair of weights vertically, movably mounted one adjacent each of a pair of wheels of such vehicle on a part thereof other than a wheel, and indicating mechanism operated by said weights for indicating a difference in forces transmitted to said weights through said wheels due to road irregularities.

5. Low pressure indicating means for a four wheeled, pneumatic-tire-equipped vehicle including: weights vertically, movably mounted one adjacent each of said wheels on a part of the vehicle other than a wheel, means operated by two of said weights for transmitting forces proportional to forces caused to be exerted thereon by road irregularities, similar means operated by the other two weights, and means for indicating a difference in forces transmitted by the two said means.

In testimony whereof, I hereunto affix my signature.

WILLIAM H. BROWN.